Oct. 12, 1965 R. K. LANMAN 3,211,811
METHOD AND APPARATUS FOR CASTING THERMOSETTING PLASTIC LENSES
Filed June 29, 1964 2 Sheets-Sheet 1

ROBERT K. LANMAN
INVENTOR.

BY
ATTORNEY

Oct. 12, 1965 R. K. LANMAN 3,211,811
METHOD AND APPARATUS FOR CASTING THERMOSETTING PLASTIC LENSES
Filed June 29, 1964 2 Sheets-Sheet 2
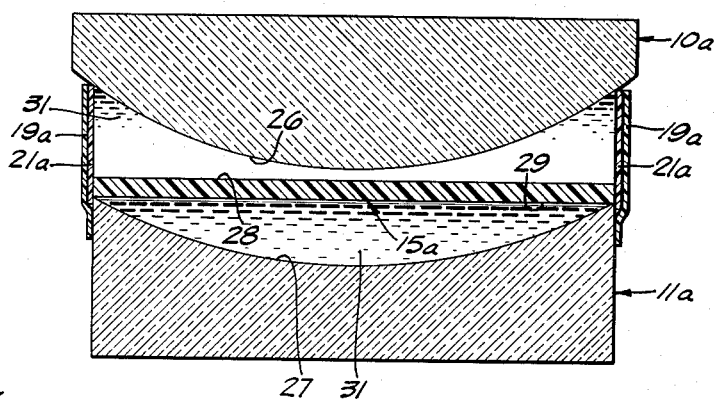
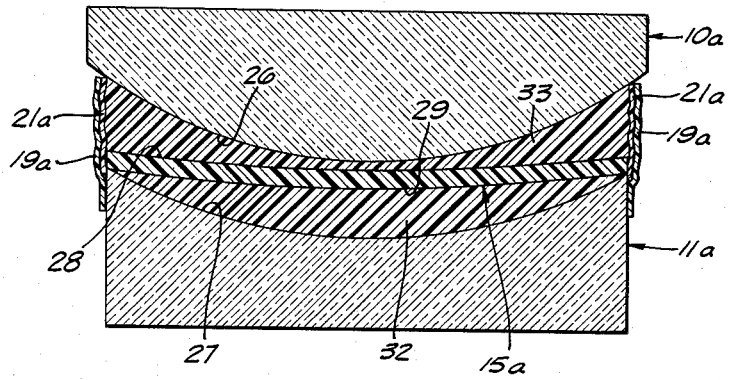
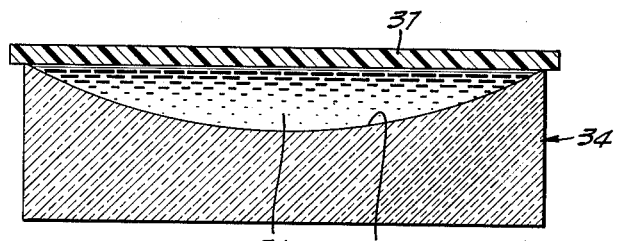
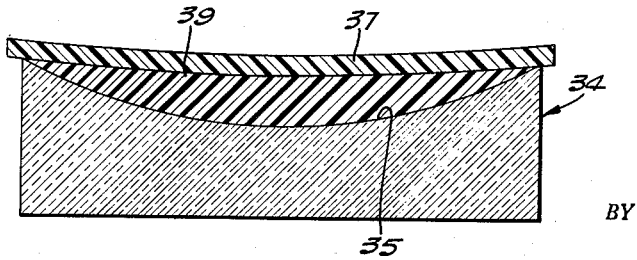
ROBERT K. LANMAN
INVENTOR.
BY
ATTORNEY

United States Patent Office 3,211,811
Patented Oct. 12, 1965

3,211,811
METHOD AND APPARATUS FOR CASTING THERMOSETTING PLASTIC LENSES
Robert K. Lanman, Pasadena, Calif., assignor to Armorlite Lens Company, Inc., Pasadena, Calif., a corporation of California
Filed June 29, 1964, Ser. No. 384,090
31 Claims. (Cl. 264—1)

This application is a continuation-in-part of my application for United States Letters Patent Serial No. 536,460, filed September 26, 1955, and of my copending application Serial No. 240,192, filed November 19, 1962, both now abandoned, and each bearing the same title as this application.

The present application relates to a method and apparatus for manufacturing lenses, and particularly eyeglass lenses. More specifically, the invention relates to a method and apparatus for casting eyeglass lenses from plastics, and particularly thermosetting plastics.

Since the advent of modern transparent plastics, a number of attempts have been made to manufacture lenses, and particularly eyeglass lenses, therefrom so as to achieve the distinct advantage of high resistance to fracture as compared to glass. Additional important reasons for resorting to plastics include an absence of the extremely high temperatures necessary to melt glass, and an absence of the expensive grinding and polishing operations which must be carried out before a glass lens is completed.

Previously manufactured plastic lenses were usually constructed of thermoplastic materials, and were relatively easy to manufacture by processes such as compression molding. However, thermoplastic materials have been characterized by relative softness and poor scratch resistance, which means that lenses manufactured therefrom may normally not be employed for a substantial length of time without resulting in a highly undesirable scratched surface and consequent reduction in clarity of vision therethrough. Previous attempts to manufacture lenses from thermosetting materials, which are much harder and more scratch resistant than thermoplastic materials, have been successful where the lenses are of relatively low power so that no substantial differences between the front and back curvatures are present, and where the lens is relatively uniform in thickness. However, where it is desired to manufacture relatively high power eyeglass lenses from thermosetting materials it has been discovered that a substantial amount of distortion results due to unequal shrinkage of the different portions of the lens upon heating thereof. The distortion has heretofore been considered impossible to predict or compensate for, so that casting of accurate high power lenses has previously been unsuccessful. This is particularly true with relation to minus or generally plano-concave lenses, as distinguished from plus or generally plano-convex lenses, since the shrinkage and distortion is very severe at the thick peripheral portion of a relatively high power minus lens.

In view of the above factors characteristics of the casting of lenses of plastic materials, and particularly of thermosetting plastics, it is an object of the present invention to provide a method and apparatus for manufacturing distortion-free lenses of thermosetting plastics and without resort to grinding or polishing operations.

A further object is to provide a method and apparatus for manufacturing relatively high power eyeglass lenses of thermosetting plastic materials, without resulting in the distortion frequently produced by conventional manufacturing operations.

A further object is to provide a method and apparatus for manufacturing plastic lenses by forming complementary minus and plus mold cavities having a relatively thin flexible mold element therebetween so that shrinkage during setting of the plastic contained within the mold cavities produces distortion forces which cancel each other out and result in distortionless plastic lenses.

Another object of the invention is the provision of an improved method of manufacturing plastic lenses utilizing in combination rigid and nonrigid flexible mold elements cooperating to form the mold cavity together with a technique for maintaining the plastic contents of the cavity in intimate contact with the mold cavity surfaces while taking a set.

Another object of the invention is the provision of a plastic lens molding technique utilizing as an essential step thereof the adhesive property for the mold cavity walls of the plastic being molded.

Another object of the invention is the provision of a plastic lens molding technique wherein the lens is formed between mold cavity forming members some of which are rigid and some of which are flexible and wherein pressure is utilized in a manner to assure the maintenance of intimate contact of the mold cavity surfaces with all surfaces of the plastic lens while being cured.

These and other more specific objects will appear upon reading the following specification and claims and upon considering in connection therewith the attached drawings to which they relate.

In the drawings:

FIGURE 1 is a schematic vertical central sectional view showing the mold elements of the invention as filled with the liquid monomer of the plastic employed;

FIGURE 2 corresponds to FIGURE 1 but illustrates the positions of the elements shown in FIGURE 1 after the liquid monomer has been polymerized, due to heating of the mold and its contents;

FIGURE 5 illustrates a modified form of the mold apparatus, in which the separating or central mold element is relatively flat or planar as compared to the dished mold element of FIGURES 1 and 2, and again illustrating the mold with liquid monomer contained therein;

FIGURE 6 corresponds with FIGURE 5 but illustrates the positions of the parts after polymerization;

FIGURE 7 is a central vertical sectional schematic view illustrating a modification in which plus lenses are cast without complementary casting of minus lenses, and showing the plastic in liquid condition; and FIGURE 8 corresponds to FIGURE 7 but illustrates the positions of the parts after polymerization of the plastic.

Stated generally, the present invention contemplates the casting of thermosetting plastic lenses in mold cavities formed between rigid and flexible mold components, the mold components being adapted to be adhesively gripped by the solidifying plastic and to maintain the solidifying plastic in the desired distortion-free shape during polymerization. More specifically, the invention contemplates the provision of complementary convex and concave mold cavities formed between outer rigid mold elements and a separating relatively thin flexible mold element, the arrangement being such that upon polymerization of a liquid monomer contained within the cavities the shrinkage and distortion forces will be transmitted through the flexible mold element and will compensate each other.

Figure 1:
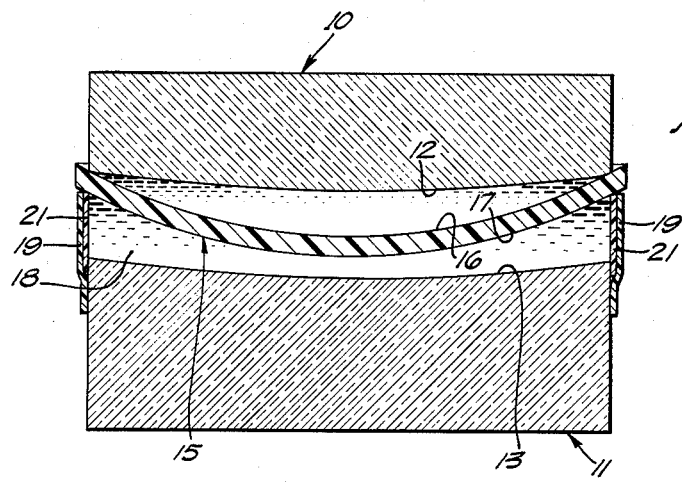
Figure 2:
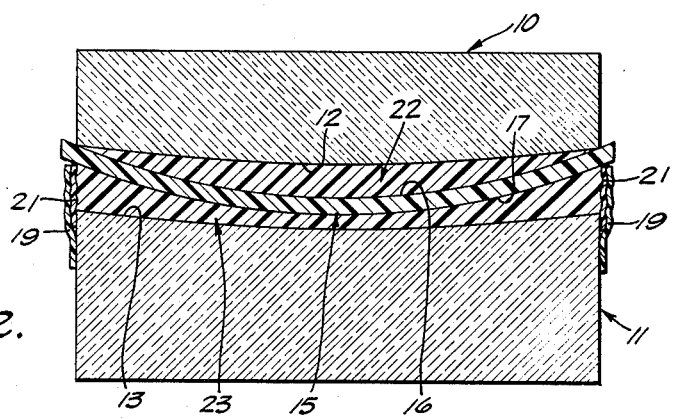

Referring first to FIGURES 1 and 2 of the drawings, there are illustrated upper and lower rigid mold elements 10 and 11 having relatively adjacent mold surfaces 12 and 13, respectively, which are shaped to effect molding of the plastic lenses. Provided in the space between surfaces 12 and 13 is a relatively thin flexible mold element 15 having smooth upper and lower mold surfaces 16 and 17 also adapted to effect molding of the plastic. The surfaces 12 and 16 define what will be referred to as a plus (generally plano-convex) mold cavity, whereas surfaces 13 and 17 define what will be referred to as a minus (generally plano-concave) mold cavity. These mold cavities are adapted to receive thermosetting plastic in the form of a liquid monomer, the monomer being indicated at 18 in FIGURE 1.

A preferred manner of defining the side wall or edge of the minus mold cavity is to wrap a strip 19 of a suitable cellulose adhesive tape, such as "Scotch Tape," around the upper peripheral portion of lower mold element 11 and projecting upwardly for the desired distance as indicated. A second strip 21 of the cellulose tape is provided with its adhesive surface disposed outermost and in contact with the inner adhesive surface of strip 19. Accordingly the smooth nonadhesive inner surface of strip 21 will be contacted by the monomer 18, and the latter will not be contaminated by the adhesive.

After strips 19 and 21 have been mounted around lower mold 11, the minus mold cavity is filled with monomer 18. Flexible mold element 15 is then placed in position so that its peripheral edge is supported by the upper edges of the cellulose strips. Thereafter, the plus mold cavity is filled with monomer 18, and upper mold element 10 is mounted in position so that its lower edge rests on the peripheral portion of flexible mold element 15. The mold is thus assembled by gravity alone in one preferred manner of practicing the invention, and no clamps, supporting elements or braces need be employed.

It is important to the invention that the plus and minus mold cavities be complementary in shape, and that flexible mold element 15 be sufficiently thin and incompressible that distortion forces present during polymerization of the monomer 18 will be transmitted through element 15 between the plus and minus mold cavities to provide compensating effects which minimize or eliminate distortion in the finished lenses. Thus, surfaces 12 and 13 are substantially parallel to each other, and surfaces 16 and 17 are also substantially parallel to each other. The amount of distortion in the finished product is largely dependent upon the degree of parallelism of surfaces 12 and 13, and 16 and 17, but it is to be understood that departure from true parallelism may be tolerated in certain instances such as when bifocal segments are to be incorporated in one or the other of the lenses. With the described complementary mold construction, the plus and minus mold cavities combine in effect to form a single cavity of uniform thickness. Since distortion is caused largely by variations in cavity (lens) thickness, it will be understood that the simulation of the uniform thickness cavity will result in elimination of distortion.

The flexible mold element 15 may be a sheet of thermosetting plastic polymer, and is desirably the polymerized form of monomer 18. The thickness of such a plastic mold element 15 should be approximately 2.5 millimeters. It may, however, be somewhat thinner if desired, but not so thin that it will lose its shape during handling and assembly of the mold. Mold 15 should not be so thick that it will be rendered inflexible or compressible to such an extent that distortion forces will not be transmitted accurately between the mold cavities. It is therefore preferred that flexible mold 15, particularly one formed of plastic such as the polymer of monomer 18, should not be thicker than about 3 millimeters. Mold 15 may also be formed of metal or the like, but then must be relatively thin in order to have the requisite flexibility.

The rigid mold elements 10 and 11 are preferably formed of glass or metal and their mold surfaces 12 and 13 are highly polished. It is to be understood that the various mold surfaces 12, 13, 16 and 17 may define any optical figures required, such as spherical, cylindrical, aspherical or a combination of these. In the illustrated form, the molds 10 and 11 are cylindrical about vertical axes, and their mold surfaces 12 and 13 are correspondingly spherical about a large radius. The surfaces 16 and 17 are also spherical but about a much smaller radius, so that flexible mold 15 is substantially dish shaped as illustrated.

It is to be understood that any suitable transparent plastic may be employed to manufacture the lenses, a preferred plastic being the thermoset allyldiglycol carbonate, which is sold under the trademark "Cr 39" by the Columbia-Southern Chemical Corporation of Barberton, Ohio. The monomer 18 of this plastic is a liquid at room temperature, but begins to solidify upon addition of the catalyst isopropyl percarbonate. The catalyst is added to the monomer prior to pouring thereof into the plus and minus mold cavities between surfaces 12 and 16, and 13 and 17, respectively. The catalyzed monomer is not poured into the mold cavities until it has partially polymerized and is relatively thick and viscous, so as to minimize the amount of shrinkage of the plastic which takes place in the molds during subsequent polymerization.

It is important to the invention that the plastic employed, and the mold elements and mold surfaces employed, be such that the plastic will adhere adhesively to the mold surfaces during polymerization. The indicated plastic "Cr 39" is desirable in that it will adhere tightly to a polished glass surface, or to a smooth surface of a sheet of the polymer of "Cr 39," during its polymerization.

It is to be understood that suitable thermosetting plastics such as "Cr 39" are characterized by substantial shrinkage or volume reduction during polymerization. It is this shrinkage which gives rise to the distortion problems which are met by the present invention.

Figure 3:
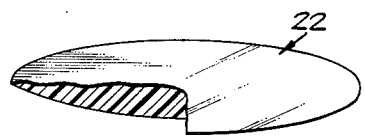
FIGURE 3 illustrates the plus lens formed with the mold apparatus shown in FIGURES 1 and 2.
Figure 4:
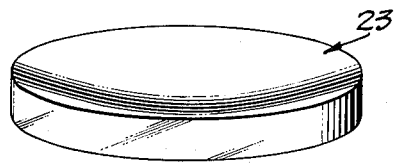
FIGURE 4 illustrates the minus lens formed with the apparatus of FIGURES 1 and 2.

The assembled mold containing monomer 18, and shown in FIGURE 1, is placed in a circulating warm air oven and heated for a sufficient length of time and at such temperatures as to effect polymerization of the monomer so that plus and minus lenses 22 and 23 (FIGURES 2–4) are formed. Various time-temperature cycles may be employed, of which the following is preferred for "Cr 39": heat for fifteen hours at 120° F., then for four hours at 130° F., then for four hours at 140° F., and finally for fifteen hours at 150° F. As above indicated, the polymerization effected by this heating results in a substantial shrinkage of the monomer 18 and causes the rigid molds 10 and 11 to be drawn closer together. As the rigid molds 10 and 11 are brought closer together due to shrinkage of the plastic, the flexible mold element 15 flexes somewhat and has a greater radius of curvature than prior to heating, but it is emphasized that the flexing of mold 15 is uniform so that the curvature and parallelism of surfaces 16 and 17 remain uniform. Because of the fact that the rigid molds 10 and 11 stick tightly to the plastic, and because of the provision of the complementary mold cavities and the thin and flexible mold element 15, the very substantial distortion forces compensate each other and do not result in distortion of the lenses as would be the case if the minus lens were cast independently of the plus lens.

After completion of the described heating operation, the mold is removed from the oven and the mold elements are separated from lenses 22 and 23. The separation is preferably effected by placing the entire mold in a cold water bath to effect a thermal shock action which releases the plastic from surfaces 12 and 13. The two lenses are then separated from the flexible mold 15 by light sharp blows around the edge of flexible mold 15. The lenses 22 and 23 are then finished, except for grinding of the edges, and are ready to be mounted onto the frames of eyeglasses, no grinding or polishing of the surfaces being necessary. The flexible mold 15 may normally not be employed a second time as a mold since it changes in curvature slightly, and does not return to its original shape. However, flexible mold 15 may be employed as a plano lens.

It will be appreciated that by providing a number of different shapes and sizes of mold elements 10, 11 and 15, and by varying the amount of upward projection of edge strips 19 and 21, substantially any required lens may be produced with the present process.

Referring next to FIGURES 5 and 6 of the drawings, a second embodiment is illustrated in which the same materials, etc., are employed as in the previous embodiment, and which like elements have been given like reference numerals except followed by the letter *a*. In this embodiment, the upper and lower mold elements 10*a* and 11*a* are provided, respectively, with relatively adjacent generally parallel surfaces 26 and 27 having relatively short radiuses of curvature so that surface 27 is dished substantially and surface 26 is downwardly convex. A flexible mold element 15*a* is then made initially relatively flat, as shown in FIGURE 5, and with its upper and lower surfaces 28 and 29 lying in parallel planes. The mold shown in FIGURE 5 carries out the principles of complementary casting described above, the only difference being that the rigid mold elements are given greater curvature than the flexible mold element instead of vice versa.

It will also be observed that the flexible separator mold element 15*a* has its rim supported on the rim edge of concave mold member 11*a*. As a result the relatively great contraction of the center portion of the underlying lens 31 will deflect the center of element 15*a* downwardly decreasing its radius of curvature and thereby similarly varying the curvature of the contacting surfaces of the plus and minus lenses 31, 31 on the opposite sides thereof. This result is the opposite of that obtaining when separator 15 is supported on the rim of a convex mold surface as illustrated, for example, in FIGURE 1. Accordingly it will be appreciated that the natural and unstressed curvature of the flexible separator mold member must be carefully selected with respect to the shape of the rigid mold member on the rim of which it is to be supported as this determines whether the curvature of the finished lens molded therefrom will have a lesser or a greater curvature.

In carrying out the invention with the apparatus shown in FIGURE 5, liquid monomer 31 is poured into the mold 11*a*, after which flexible mold element 15*a* is mounted thereover so that its edges rest on the peripheral upper edge portion of rigid mold 11*a*. The tape 19*a* and 21*a* is then mounted therearound and in such a manner as to project for a substantial distance upwardly as illustrated. Thereafter, the monomer 31 is poured into the space defined by flexible mold element 15*a* and the peripheral tape, after which rigid mold element 10*a* is inserted in position in such a manner that it rests on the upper edge of tape 19*a* and 21*a*. A concave or minus mold cavity is thus formed between surfaces 26 and 28, whereas the convex or plus mold cavity is formed between surfaces 27 and 29.

The filled mold is then treated by heating as described in connection with the first embodiment, and results in the structure shown in FIGURE 6, that is to say, in a plus lens 32 and a minus lens 33. During the heating operation the flexible mold element 15*a* flexes slightly, due to the controlled shrinkage operation, but distortion forces are compensated for as in the first embodiment.

Proceeding next to FIGURES 7 and 8, it has been discovered that with certain relatively high power plus lenses distortion may be controlled adequately without carrying on the complementary casting operation described above. However, and as previously indicated, relatively high power minus or concave lenses may not be satisfactorily cast without using the described complementary principles, since the distortion in the thick edge portions is excessive. The apparatus shown in FIGURES 7 and 8 is adapted to cast plus lenses, and in the very simple manner next to be described.

A rigid mold 34, which is preferably formed of glass or metal and has a highly polished upper dished mold surface 35, is first filled with the monomer 36. A smooth (preferably planar) flexible mold element 37 is then mounted thereover so as to rest on the periphery of mold 34. The curvature of surface 35 is, of course, that desired for the finished plus lens which is shown at 39 in FIGURE 8.

In practicing the method as taught in FIGURES 7 and 8, the filled mold shown in FIGURE 7 is treated by heating, as described in connection with the previous embodiments, which results in polymerization and shrinking of the plastic. During polymerization, the flexible mold element 37 remains adhesively secured to the plastic and becomes downwardly dished. Because of the rigid locking between the mold elements 34 and 37 and the plastic therebetween, and because of the fact that the periphery of the plus lens is relatively thin, the restricting forces are adequate to maintain distortion within desired tolerances. After completion of heat treating, the parts are separated as previously described, and the plus lens 39 is produced without any grinding or polishing operations.

The flexible mold element 37 may be formed of a plastic such as the polymer of the plastic of which the lens is being produced. It may be substantially thicker than described in connection with FIGURES 1, 2, 5 and 6, due to the fact that there is no complementary lens to which it is desired to transmit the distortion forces. It has been found that the plastic flexible mold may, with the embodiment of FIGURES 7 and 8, be as thick as ten millimeters and still have sufficient flexibility to produce the desired results. Flexible mold 37 should not, however, be less than about two millimeters in thickness. Mold 37 may also be formed of metal, in which event it must be made relatively thin in order to have sufficient flexibility.

In practicing the plastic lens molding techniques discussed above reliance has been placed on two important factors, namely, (1) the use in combination of a pair of mold elements one of which is rigid and nonflexible and the other of which is nonrigid and flexible, and (2) a thermosetting plastic having high adhesive characteristics for at least the rigid element of the mold. However, certain plastics have low or uncertain adhesive properties for materials otherwise found suitable for the rigid mold. In these circumstances it is found the invention may be practiced successfully by applying active pressure to the exterior of the mold elements in such manner and amount as to maintain the lens in initimate contact with the cavity surface of the rigid element, the required pressure also acting to maintain the flexible mold element in intimate contact with the surface of the plastic contents until these have been cured. In the first two described techniques opposed pressures are applied toward one another from the exterior outer sides of rigid mold members 10 and 11. In the third technique fluid pressure should be applied to substantially the entire outer surface of flexible mold member 37. Although the pressure in all cases may be applied by hand, it is more convenient to use suitable presses for this purpose.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. Apparatus for casting optical plastic lenses, which comprises mold means to define complementary plus and minus mold cavities for forming optical lenses, said mold means including a flexible mold element separating said lens-forming cavities and of sufficient thinness and incompressibility to transmit hydraulic forces between said cavities.

2. Apparatus for casting optical plastic lenses as defined in claim 1 characterized in that said flexible mold element has a substantially smaller curvature than the curvature of the cavity surfaces of the mold means to either side of said flexible mold element, thereby permitting said flexible mold element to flex with a relatively small applied force.

3. Apparatus for casting optical lenses of thermosetting plastic material, which comprises first and second rigid mold elements each having a highly polished mold surface for forming very smooth surfaced optical lenses, said mold surfaces of said rigid mold elements being generally parallel to each other and being disposed opposite and spaced from each other, and a flexible mold element mounted between said rigid mold elements and having smooth mold surfaces which are generally parallel to each other, said mold surfaces of said rigid and flexible mold elements being shaped to define at least the major portions of plus and minus mold cavities on opposite sides of said flexible mold element.

4. The invention as claimed in claim 3, in which said flexible mold element is characterized by sufficient thinness and incompressibility to transmit distortion forces between said mold cavities.

5. The invention as claimed in claim 3, in which said mold surfaces are adapted to be adhesively gripped by said plastic during polymerization thereof.

6. The invention as claimed in claim 3, in which said flexible mold element is the polymer of a thermosetting plastic and is less than three millimeters in thickness.

7. Apparatus for casting optical lenses of thermosetting plastic, which comprises first and second rigid mold elements formed of glass and each having a highly polished mold surface, said mold surfaces being of substantially corresponding flatness or curvatures, a flexible mold element having substantially parallel mold surfaces and being characterized by sufficient thinness and incompressibility to permit transmission therethrough of distortion forces created during polymerization of said plastic, and means to mount said rigid mold elements so that said mold surfaces thereof are opposite, spaced from and substantially parallel to each other and also to mount said flexible mold element therebetween, said mold surfaces being adapted to define generally plano-convex and plano-concave mold cavities on opposite sides of said flexible mold element.

8. The invention as claimed in claim 7, in which said mounting means comprises a strip of flexible plastic mounted peripherally of said first rigid mold element and having a free rim edge projecting above the mold surface a uniform distance throughout for supporting another of said mold elements.

9. The invention as claimed in claim 7, in which said flexible mold element is formed of the polymer of said plastic.

10. A method of casting plastic lenses, which comprises providing mold means to define complementary mold cavities separated by a flexible portion of said mold means, said flexible portion being adapted to transmit compression forces therethrough, filling said mold cavities with a fluid form of said plastic, and treating said mold means and plastic to effect setting of said plastic.

11. A method of casting eyeglass lenses of a thermosetting plastic which is characterized by shrinkage and adhesion during polymerization thereof, which comprises providing first and second rigid mold elements each having a highly polished mold surface which substantially corresponds to the mold surface of the other, providing a relatively thin flexible mold element having substantially parallel smooth mold surfaces, said mold surfaces of said rigid and flexible mold elements being shaped to define complementary plus and minus mold cavities and being adapted to be adhesively gripped by said plastic during polymerization thereof, assembling said rigid mold elements so that mold surfaces thereof are in spaced parallel relation and so that said rigid mold elements may move closer together during polymerization of said plastic, disposing said flexible mold element between said rigid mold element so that complementary plus and minus mold cavities are formed between said mold surfaces, filling said cavities with the monomer of said plastic, heating said mold elements and monomer to effect polymerization of said monomer, and separating the resulting plus and minus lenses from said mold elements.

12. A method of casting lenses of plastic having a high shrinkage coefficient which comprises providing a rigid mold element having a highly polished mold surface adapted to be adhesively gripped by said plastic during solidification thereof, providing a flexible mold element having a smooth mold surface also adapted to be adhesively gripped by said plastic during solidification thereof, assembling said rigid and flexible mold elements in such manner that said mold surfaces define at least the major portion of the opposed surfaces of a mold cavity, filling said cavity with a relatively viscous fluid form of said plastic, and treating said mold elements and said plastic to effect solidification of said plastic, whereby the differential shrinkage of the thicker portions of the lens acting in concert with the adherence of the same to the surface of said rigid mold element and to said flexible mold element causes the latter to assume a progressively greater curvature as said plastic takes a set.

13. That method of casting plano-concave optical lenses from plastic material by the use of a pair of rigid outer molds having substantially complementary opposed lens-forming faces supported in spaced-apart parallel relation, which method is characterized by the use of a thin flexible separator disk having its rim edge in contact with the rim edge of one of said rigid molds and cooperating therewith in dividing the mold cavity into two lens forming chambers, one of which is shaped to form a plano-concave lens from fluid thermosetting material contained therein, and subjecting said mold while filled with fluid thermosetting material to heat until the material has fully set whereby said rigid molds move toward one another and the center portion of said flexible separator disk moves toward the center of the rigid mold member more distant therefrom as the intervening plastic material contracts in setting.

14. That method of lens casting defined in claim 13 wherein said mold members are assembled in vertically superimposed relation and wherein the setting of said plastic material takes place independently of externally applied pressures to said rigid mold members other than the normally-occurring application of atmospheric pressure.

15. That method of casting plano-concave lenses from thermosetting plastic material which lenses are substantially free of distortion due to unequal stresses resulting from contraction in areas of different thicknesses occurring as said material takes a set, said method comprising supporting in spaced parallel relation a pair of rigid outer mold members having parallel opposed curved surfaces, separating the intervening cavity into plano-concave and plano-convex chambers by a flexible dished diaphragm having its rim in contact with the rim of one of said rigid mold members, filling both of said chambers with fluid thermosetting plastic material, and subjecting said mold and its contents to heat until said material has set.

16. That method of casting optical lenses defined in claim 15 wherein said plastic-filled mold is subject to heat in consecutive stages in each of which the temperature is increased until a final set has occurred.

17. That method of casting optical lenses defined in claim 16 wherein said lenses are removed from the hot mold by thermal shock as the hot mold is bathed in cold water to break the strong adhesive bond between the lenses and the mold surfaces contacted thereby.

18. That method of casting optical lenses defined in claim 16 including the use of high-strength flexible tape wrapped about the periphery of one of said rigid mold members and projecting a predetermined distance thereabove and serving to confine fluid plastic in one of said lens-forming chambers and also as a support for the upper mold member.

19. That method of casting optical lenses from plastic material by the use of a pair of rigid outer mold members having complemental minus and plus curved surfaces supported in spaced parallel relation characterized by the use of a flexible dished diaphragm to divide the space between said members into two mold cavities, one of which is of plano-convex shape and the other of plano-concave shape, filling said cavities with fluid thermosetting material and subjecting the filled mold assembly to heat until said material takes a set whereby the contraction of said plastic transversely of the thickness of said cavities produces a change in the curvature of said diaphragm without causing optically disruptive distortions in the surfaces of the plastic lenses.

20. An apparatus for forming smooth surfaced higher diopter optical lenses of transparent plastic material having a high shrinkage factor which apparatus comprises, a rigid mold element and an opposed flexible mold element having surfaces cooperating to define the opposite curvilinear surfaces of a mold cavity suitable for molding an optical lens having opposed surfaces of substantially different curvatures, said mold cavity being fillable with said plastic material in liquid form, said transparent plastic material having strong adhesive properties forming a strong bond with the juxtaposed surfaces of both said rigid and flexible mold elements during solidification of said liquid plastic while being heated within said mold cavity, said adhesive bond with said mold elements being sufficiently strong to change the curvature of said flexible mold element as said plastic material takes a set, and said flexible mold element being of substantially uniform thickness opposite the cavity forming portion thereof and being gradually deflectable curvilinearly toward the surface of said rigid mold element as said plastic material takes a set.

21. Lens casting apparatus as defined in claim 20 characterized in that said flexible mold element has a radius of curvature substantially smaller than the radius of curvature of the opposed cavity surface of said rigid mold element and in that said flexible mold element is substantially flat and planar at the start of the curing operation of a plastic charge in the mold cavity.

22. A method of casting optical lenses of plastic material having a high shrinkage factor which method comprises, providing a rigid mold element having a highly polished curvilinear mold surface suitable for molding optical lenses requiring no finish grinding after removal from the mold, forming a curvilinear mold cavity therewith by superimposing over said rigid mold element a thin-walled sheet-like mold element of flexible material having a smooth mold surface, assembling said rigid and flexible mold elements to define a mold cavity for optical lenses, filling said lens forming cavity with a transparent thermosetting plastic material in fluid form having a high shrinkage factor and the property of forming a strong adhesive bond with the opposed lens forming surfaces of said cavity, and treating said mold elements and said plastic material to effect solidification of said fluid plastic, whereby said plastic, on solidification, shrinks causing said flexible mold element to be deflected toward the surface of the cavity formed by said rigid mold member.

23. A method of casting optical lenses of plastic material which method comprises, providing a rigid mold element having a polished curvilinear mold surface of the contour desired on one face of the finished lens, substantially filling the depression formed by said mold surface with fluent uncured transparent plastic having a high coefficient of shrinkage during solidification, superimposing thereon a thin flexible disk-like mold element having a downwardly-facing curvature of larger radius than said rigid mold element thereby causing excess plastic to overflow as said flexible mold element comes to rest parallel with the rim of said first mentioned mold surface and with the mold cavity so formed completely filled with fluent plastic, and maintaining said flexible mold element in contact with said fluent plastic to keep the latter uniformly distributed and the mold cavity completely filled and in intimate contact with a predetermined mold control surface provided by the polished mold surface of said rigid mold element while treating said plastic material to effect the solidification thereof, and thereafter separating the lens so cast from said mold elements.

24. A method of casting optical lenses of plastic material which method comprises, providing a rigid mold element having a polished curvilinear mold surface of the predetermined precise contour desired on one face of the finished lens, substantially filling the depression formed by said mold surface with fluent uncured transparent plastic material having a shrinkage factor during solidification, superimposing thereon a thin flexible disk-like mold element having a downwardly facing curvature thereby causing a portion of said fluent plastic material to overflow while leaving the cavity between the adjacent surfaces thereof completely filled with said plastic material, applying pressure to the exterior side of said flexible mold element as the plastic material is treated to solidify the same to produce a finished lens having a surface contour conforming precisely to the surface contour of said rigid mold element and a second surface contour of slightly shorter radius than at the beginning of the solidification treatment of said plastic material and resulting from the greater shrinkage of the thicker central portion of said lens during its solidification.

25. Molding apparatus for the casting of plastic optical lenses requiring no finish grinding after removal from the casting apparatus comprising, a rigid mold element having an upwardly facing highly polished concavity not subject to change of shape during the use of the mold, a cooperating downwardly curved disk-like mold element of flexible material adapted to change shape slightly while said plastic shrinks in taking a set, the lower surface of said flexible mold element being highly polished and having an initial radius of curvature greater than the surface of said rigid mold element and slightly greater than that desired in the lens to be cast, said rigid and flexible mold elements cooperating to form a lens casting cavity, and means for applying uniformly distributed pressure to the exterior of said flexible mold element opposite the lens casting cavity thereof while plastic material contained within said cavity is taking a set, said pressure being effective to flex said flexible mold element downwardly as the setting plastic lens shrinks in setting and causing the polished lower surface of the flexible mold to remain in full and continuous contact with the entire upper surface of the lens casting.

26. That method of casting optical lenses of thermosetting plastic material which lenses require no finish grinding after removal from the forming mold, said method comprising forming a smooth-surfaced concavity in a rigid mold member, filling said concavity with fluid thermosetting plastic material of a type having the property of forming a strong bond with both mold surfaces during setting and which bond is severable cleanly from the mold after molding is completed and which thermosetting plastic material is subject to pronounced shrinkage while taking a set, shaping substantially the entire fluid surface of the plastic charge by means of a dished flexible diaphragm having its rim supported on the underlying rim of said concavity and its own concave side facing upwardly, and subjecting said assembly to heat until said material has taken a set and thereby causing said flexible diaphragm to assume a curvature of smaller radius than at the beginning of the setting operation.

27. That method defined in claim 26 characterized in quickly chilling said mold assembly while hot by bathing the same in a relatively cold fluid to sever the adhesive bond between said lens and the mold members in contact therewith.

28. That method defined in claim 27 characterized in that the convex side of said dished flexible diaphragm has an initial curvature of greater radius than desired for the surface of the finished lens being molded by contact with said diaphragm.

29. Apparatus for use in casting a high precision optical lens of thermosetting plastic material of a type having strong adhesive properties for the materials used in forming the casting cavity walls, said apparatus comprising first and second mold members each having a highly polished face effective to form one face of the lens to be cast therewith, flexible walled means secured to and engaging only the outer peripheral surface of said first mold member with no portion projecting inwardly of said peripheral surface and projecting axially beyond the polished face thereof by distances corresponding to the thickness of the juxtaposed rim of the casting to be made and effective to hold the two mold members accurately spaced apart as well as being effective to close the rim of the mold cavity, said second mold member being adapted to be supported by gravity against the exposed upper rim edge of said flexible walled means with the polished face thereof cooperating with the other polished face and with the interior of said flexible walled means in forming a casting cavity.

30. Apparatus as defined in claim 29 characterized in that said flexible walled means comprises inner and outer layers of cellulose tape coated on one side with pressure sensitive adhesive and wherein the coated sides of the tape are in contact with one another to avoid having said adhesive coating exposed to the mold cavity.

31. Apparatus as defined in claim 30 characterized in that the outer layer of said tape is wider than said inner layer and is arranged to contact the peripheral edge of said first mold member to support said tape firmly in a desired assembled position thereon.

References Cited by the Examiner

UNITED STATES PATENTS

| | | | |
|---|---|---|---|
| 2,328,525 | 8/43 | Egolf | 264—331 |
| 2,542,386 | 2/51 | Beattie | 264—1 |
| 2,593,827 | 4/52 | Anspon et al. | 264—300 |
| 3,038,210 | 6/62 | Hungerford et al. | 264—1 |

ALEXANDER H. BRODMERKEL, *Primary Examiner.*